United States Patent
Szabo

[11] Patent Number: 5,951,063
[45] Date of Patent: *Sep. 14, 1999

[54] QUICK CONNECTOR WITH SNAP-ON RETAINER HAVING ENHANCED ENGAGEMENT

[75] Inventor: George Szabo, Ortonville, Mich.

[73] Assignee: ITT Manufacturing Enterprises, Inc., Wilmington, Del.

[*] Notice: This patent is subject to a terminal disclaimer.

[21] Appl. No.: 08/839,155

[22] Filed: Apr. 23, 1997

Related U.S. Application Data

[63] Continuation-in-part of application No. 08/473,729, Jun. 7, 1995, Pat. No. 5,730,481.

[51] Int. Cl.$^6$ .................................................... F16L 37/12
[52] U.S. Cl. .......................... 285/303; 285/319; 285/921
[58] Field of Search ...................................... 285/305, 319

[56] References Cited

U.S. PATENT DOCUMENTS

| | | |
|---|---|---|
| 1,298,878 | 4/1919 | Brown . |
| 1,893,979 | 1/1933 | Barrere . |
| 2,021,241 | 11/1935 | Mall . |
| 2,423,726 | 7/1947 | Prata . |
| 3,245,702 | 4/1966 | Smith . |
| 3,560,027 | 2/1971 | Graham . |
| 3,794,057 | 2/1974 | Badger . |
| 4,244,608 | 1/1981 | Stuemky . |
| 4,423,892 | 1/1984 | Bartholomew . |
| 4,431,218 | 2/1984 | Paul, Jr. et al. . |
| 4,433,861 | 2/1984 | Krelzik . |
| 4,524,995 | 6/1985 | Bartholomew . |
| 4,526,411 | 7/1985 | Bartholomew . |
| 4,561,682 | 12/1985 | Tisserat . |
| 4,591,192 | 5/1986 | Van Exel et al. . |
| 4,650,221 | 3/1987 | Caillouet, Jr. . |
| 4,787,770 | 11/1988 | Lewis . |
| 4,792,163 | 12/1988 | Kulle . |
| 4,869,534 | 9/1989 | Ketcham et al. . |
| 4,874,174 | 10/1989 | Kojima et al. . |
| 4,913,467 | 4/1990 | Washizu . |
| 4,925,217 | 5/1990 | Ketcham . |
| 4,936,544 | 6/1990 | Bartholomew . |
| 4,946,205 | 8/1990 | Washizu . |
| 4,948,175 | 8/1990 | Bartholomew . |
| 5,016,922 | 5/1991 | Le Mer et al. . |
| 5,069,424 | 12/1991 | Dennany, Jr. et al. . |
| 5,102,313 | 4/1992 | Szabo . |

(List continued on next page.)

FOREIGN PATENT DOCUMENTS

| | | |
|---|---|---|
| 488844 | 6/1992 | European Pat. Off. . |
| 9315349 | 8/1993 | European Pat. Off. . |
| 3739745 | 11/1988 | Germany . |
| 1317266 | 10/1987 | Russian Federation . |
| 1404747 | 6/1988 | Russian Federation . |
| 2087021 | 5/1982 | United Kingdom . |

*Primary Examiner*—Eric K. Nicholson
*Attorney, Agent, or Firm*—Robert P. Seitter

[57] ABSTRACT

A retainer for releasably locking together the male and female component of a quick connector. The retainer is releasably insertible into a transverse bore in the female component and includes a surface slidable over a radial flange on the male component only when the male component is fully seated in an axial bore in the female component. The engagement of the surface and the radial flange on the male component permits full insertion of the retainer into the transverse bore in the female component and around the male component to lock the male and female components together. Lock projections on the retainer engage grooves in the housing to releasably lock the retainer in a partially inserted, shipping position in the transverse bore and engage exterior lock surfaces on the housing on full insertion of the retainer to prevent separation of the retainer from the female component. The projections are formed of up-turned angled hooks which are engageable with complimentary shaped, and angled recesses in the grooves in the housing or angled exterior surfaces on the housing to resist pull out of the retainer from either the partially inserted or fully inserted positions in the housing.

8 Claims, 3 Drawing Sheets

U.S. PATENT DOCUMENTS

| | | |
|---|---|---|
| 5,152,555 | 10/1992 | Szabo . |
| 5,178,424 | 1/1993 | Klinger . |
| 5,211,427 | 5/1993 | Washizu . |
| 5,213,376 | 5/1993 | Szabo . |
| 5,226,679 | 7/1993 | Klinger . |
| 5,275,443 | 1/1994 | Klinger . |
| 5,277,402 | 1/1994 | Szabo . |
| 5,297,818 | 3/1994 | Klinger . |
| 5,348,353 | 9/1994 | Derweerdt . |
| 5,354,102 | 10/1994 | Carman . |
| 5,360,237 | 11/1994 | Carman . |
| 5,401,063 | 3/1995 | Plosz . |
| 5,405,175 | 4/1995 | Bonnan, II et al. . |
| 5,423,577 | 6/1995 | Ketcham . |
| 5,452,924 | 9/1995 | Kujawski . |
| 5,542,716 | 8/1996 | Szabo . |
| 5,586,792 | 12/1996 | Kalahasthy et al. ............ 285/305 |
| 5,683,117 | 11/1997 | Corbett et al. ............... 285/305 |
| 5,730,481 | 3/1998 | Szabo ........................... 285/305 |
| 5,782,502 | 7/1998 | Lewis ........................... 285/305 |
| 5,799,986 | 9/1998 | Corbett et al. ............... 285/305 |
| 5,863,077 | 1/1999 | Szabo et al. ..................... 285/3 |

QUICK CONNECTOR WITH SNAP-ON RETAINER HAVING ENHANCED ENGAGEMENT

CROSS REFERENCE TO APPLICATION

This application is a continuation-in part of U.S. patent application Ser. No. 08/473,729, filed Jun. 7, 1995, now U.S. Pat. No. 5,730,481.

BACKGROUND OF THE INVENTION

1. Field of the Invention

The present invention relates, in general, to quick connectors and, more specifically, to quick connectors including an internal retainer and means providing an indication of complete coupling between the male and female elements of the quick connector.

2. Description of the Art

Snap-fit or quick connectors are employed in a wide range of applications, particularly, for joining fluid carrying conduits in automotive and industrial application. In a typical quick connector, a retainer is fixedly mounted within a bore in a housing of a female connector component or element. The retainer has a plurality of radially extending legs which extend inwardly toward the axial center line of the bore in the housing. A tube or fitting to be sealingly mounted in the bore in the female component includes a radially upset portion or flange which abuts an inner peripheral surface of the retainer legs. Seal and spacer members as well as a bearing or top head are typically mounted in the bore ahead of the retainer to form a seal between the housing and the male fitting when the male fitting is lockingly engaged with the retainer legs.

While such a retainer is usually effective in releasably coupling the male and female elements of a quick connector, it is possible that the male fitting may be partially, but not fully seated or coupled to the internal seal elements in the bore of the female component and not fully locked in position by the retainer legs. In this partially engaged position, the male fitting may work itself free of the housing thereby leading to leaks in the fluid delivery system.

As it is desirable to ensure that the male and female elements are fully coupled to prevent leaks, various indicators have been provided to indicate a full coupling or seating of the male fitting in the female element. In one type of indicator shown in U.S. Pat. No. 4,925,217, a deformable member is assembled within the fitting which includes elongated members extending out of the housing between the male and female elements prior to coupling and which are retracted, and no longer visible, once the coupling has been fully accomplished. The annular member in this device remains in assembly with the quick connector and contributes to component count, tolerance stack-up and possible misassembly. Furthermore, the elongated members which are visible during non-coupling of the connector are, by design, not visible after coupling is fully effected. In many applications, such as an extremely crowded engine compartment of a motor vehicle, the installed coupling may be difficult to see and inspect closely. Thus, the inability to see the elongated members from a distance or from an awkward position will not result in a high degree of confidence that the coupling has in fact fully taken place.

Other types of visual indicators, as shown in U.S. Pat. No. 4,946,205, are removable after full coupling of the male and female quick connector elements. However, the indicator disclosed in this patent is complex and adds considerable axial length to the quick connector.

To overcome these problems and to provide an advancement in the quick connector art, the quick connect insertion indicator clip disclosed in U.S. Pat. No. 5,152,555, and assigned to the assignee of the present invention, was devised. This indicator clip includes a flag portion positioned externally of the quick connector and has members extending from the flag portion to embrace the female element of the quick connector. Engagement tabs extending from the members through registering apertures in the female element will contact an abutment surface formed on the male element upon fully coupling of the male and female components to enable removal of the indicator device as verification of complete or full coupling. When coupling is incomplete or not fully effected, the indicator device cannot be removed from the female component.

While the insertion indicator clip disclosed in U.S. Pat. No. 5,152,555 provides an easily visible indication of complete coupling of quick connector components, the quick connector still requires a separate retainer to lockingly couple the male and female components together.

U.S. Pat. No. 5,102,313 discloses a retainer clip having a centrally located slot for envelopingly engaging the radial flange on a male conduit when the male conduit is fully inserted into the female portion of a coupler. However, in this arrangement, if the clip is inserted into the housing axially ahead of the radial flange on the male conduit, the length of the male conduit between the flange and the forward tip end of the male conduit is sufficient to at least partially engage a seal mounted in the female housing. This could cause a subsequent leak since the male conduit, while appearing to be fully inserted into the female housing, is only partially engaged with the seal and, further, is not locked in a fixed portion in the female housing by the retainer clip.

To address these problems, a quick connector with a snap-on retainer disclosed in U.S. Pat. No. 5,542,716 was developed. This retainer is releasibly insertible into a transverse bore formed in female housing and includes an internal recess engageable with the radial flange on the male component only when the male component is fully coupled in an axial bore in the female component. The engagement between the recess and the radial flange permits full insertion of the retainer into the transverse bore and locks the male component and the female component together. The female component has opposed interior surfaces spaced sufficiently apart to permit the deflectable legs on the retainer to flex apart while they are being slidingly urged over the male component and to snap over the male component in the locked position. The opposed surfaces block full insertion of the retainer into the female component when the male component is not fully seated in the component. Lock projections on the retainer releasibly lock the retainer in a partially inserted, shipping position in the transverse bore in the female component.

This quick connector, as well as its subsequent improved counterparts, referenced above, meet the required functions of providing a visual indication of a sealed and locked connection between the male and female components, providing an "avalanche effect" retainer clip, releasible without special tools, and insures that the male component be fully inserted into the female component before the retainer can be urged into the latched position.

Thus, it would be desirable to provide a retainer for a quick connector which performs the functions of lockingly engaging the female and male connector components, provides a visual indication of a sealed and locked coupling between the male and female components, is releasable without special tools, requires that the male component be fully inserted before the retainer can be pushed into the latched position on the female component, and provides an "avalanche effect" retainer clip. It would also be desirable to provide a retainer for a quick connector which can be installed in a temporary engaged position on the female component of the quick connector for shipment and subsequent use. Finally, it would be desirable to provide a retainer and quick connector which has enhanced engagement features which resists separation.

SUMMARY OF THE INVENTION

The present invention is a quick connector with a snap-on retainer means which provides releasable locking engagement of male and female components of the quick connector.

The present quick connector includes mating male and female components. The female component includes a housing having an axially extending bore terminating at an open end of the housing for receiving the male element therein. A transverse bore formed by opposed apertures extends through the housing in communication with the axially extending bore. The male component has a radially enlarged portion spaced from one end. A retainer means is completely slidable through the transverse bore in the housing only when the male component is fully coupled to the female component for releasably locking the male and female components together.

The retainer means includes a body having an end wall and first and second spaced legs extending from the end wall. Means are formed on the body for releasably locking the body in a partially inserted position in the transverse bore in the housing. Preferably, the releasably locking means comprises a projection formed on at least one and preferably both of the first and second legs. The projection engages a groove formed on an inner surface of the axial bore in the housing. The projection is also positioned to engage an outer surface of the housing after the ends of the legs of the retainer have passed completely through the transverse bore in the housing.

In a preferred embodiment, the projection on the legs of the retainer have a hook-like angular tip extending angularly outward and upward from a lower portion of the legs at an acute angle with respect to each leg of the retainer. Correspondingly, the grooves formed in the housing have a complimentary shaped recessed portion which receives the tip of the projection in a registered fit. Similarly, the outer surface of the housing adjacent the edges of one of the apertures forming the transverse bore in the housing may also have a shape complimentary to the hook-like shape of the tip of the ends of the legs to engage the legs and provide a high pull out force resistance.

The snap-on retainer and quick connector of the present invention provide several advantages over previously devised retainers and quick connectors. The retainer serves the multiple functions of lockingly engaging the male and female components of the quick connector, and providing a visual indication of complete and locked coupling of the male and female components. Further, the present retainer may be mounted in a partially inserted position on the female component of the quick connector for shipment and for ease of use after the male component has been inserted into the female component. Further, the present retainer requires that the male component be fully inserted into the female component before the retainer can be pushed into the fully latched position on the female component.

The hook shaped tips of the legs of the retainer body and the complimentary shaped recessed portion of the grooves in the housing provide an interlocking effect which increases the pull out force resistance of the retainer from the housing. In addition, the angular extent of the hook shaped tips of the legs forces the ends of the legs laterally inward as the retainer is inserted into the housing. This creates a distinct "avalanche effect" as the hook shaped tips of the legs snap into the grooves in the housing or move laterally outward as the tips of the legs exit the transverse bore in the housing. This provides a tactile feel to the installer that the retainer is in the partially inserted or fully inserted position thereby insuring a complete lock of the retainer in the housing and the male component to the female component.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENT

Figure 1:
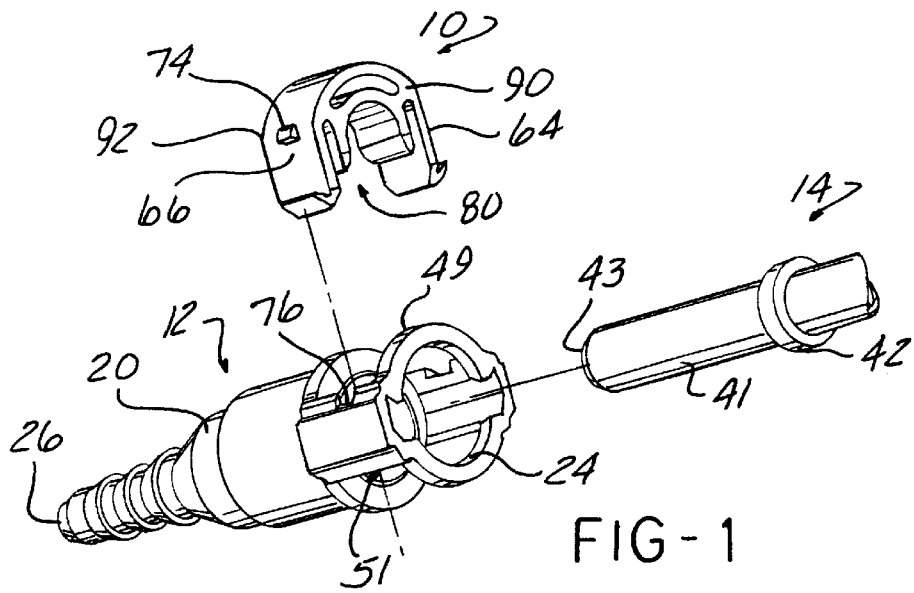
FIG. 1 is an exploded, perspective view of a quick connector with a snap-on retainer according to the present invention.

Referring now to FIGS. 1–9 of the drawing, there is depicted a snap-on retainer 10 which lockingly couples female and male components 12 and 14, respectively, of a quick connector 16.

The following description of the female connector component or element 12 is by way of example only as the female connector component 12 may have any suitable shape typically found in quick connectors.

Figure 5:
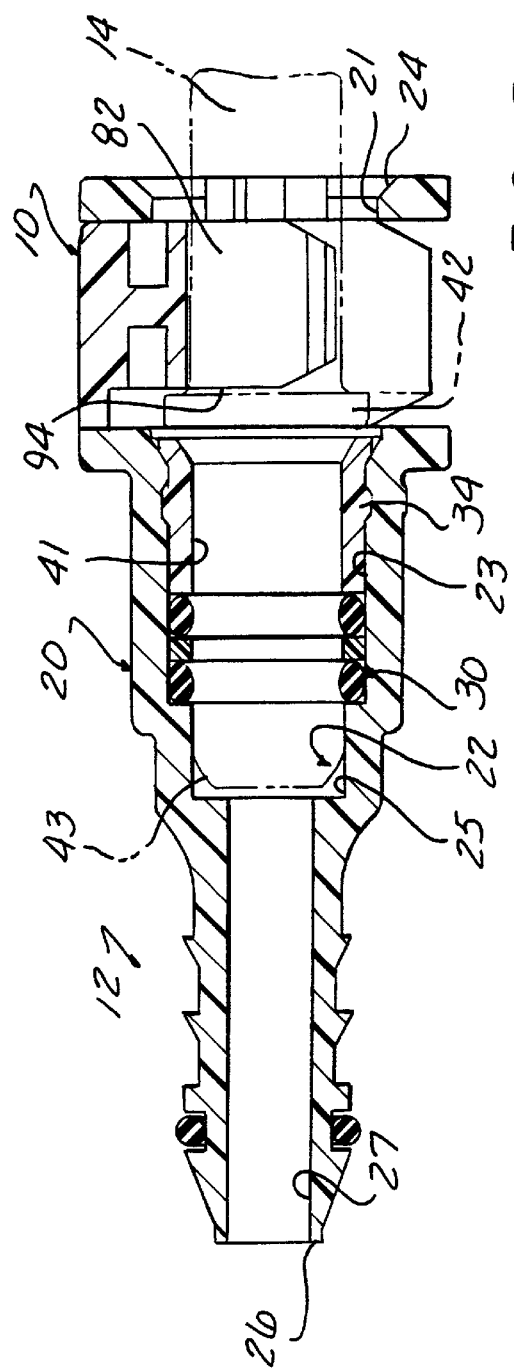
FIG. 5 is a cross sectional view generally taken along line 5—5 in FIG. 4.

The female component includes a housing 20 having an elongated, axially extending, internal stepped bore 22 extending from a large diameter first, open end 24 to a smaller diameter, second open end 26, as shown in detail in FIG. 5. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 42 formed on the male component or fitting 14. Further, the inner diameters of the seal means 30 and the top hat 34 are sized to sealingly engage the outer diameter of the end portion 41 of the male component 14 extending from the radially enlarged flange 42 to the tip end 40 of the male component 14. The third stepped bore portion 25 has an inner diameter sized to snugly engage the outer diameter of the end portion 41 of the male component 14 when the male component 14 is fully inserted into the stepped bore 22 as described hereafter.

Figure 3:
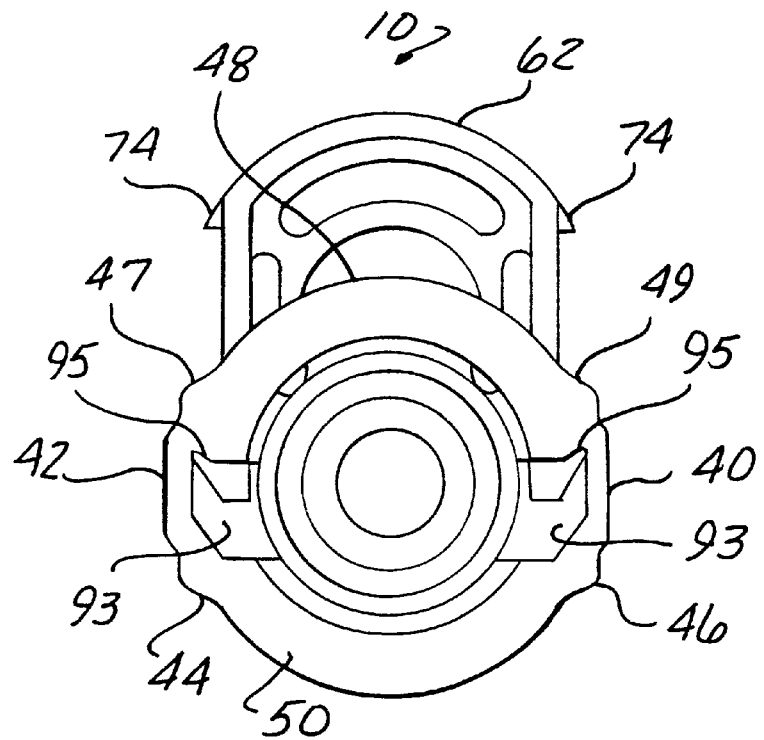
FIG. 3 is an end view of the quick connector and snap-on retainer with the retainer shown in a partially inserted, storage position of the snap-on retainer.
Figure 4:
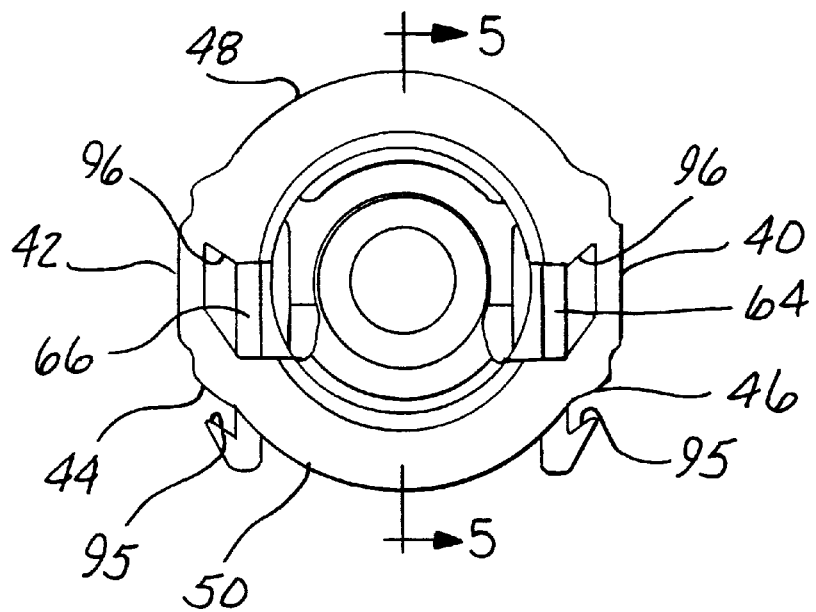
FIG. 4 is an end view of the quick connector and snap-on retainer with the retainer depicted in a fully inserted, position in the female component.

As shown in FIGS. 1, 3, 4 and 6, the first end 24 of the housing 12 is formed with a pair of opposed, exterior flats 40 and 42. The flats 40 and 42 are diametrically opposed on the first end 24 and may be centrally located on each diametrical side of the first end 24. The adjacent surfaces of the housing 20 form an opposed pairs of lock surfaces or flats, such as a first flat 44 and a second flat 46. A second pair of flats 47 and 49 are formed on the other side of the flats 44 and 46. The flats 44 and 46 extend axially a short distance along the first end 24 of the housing 20. The opposed surfaces 48 and 50 of the first end 24 of the housing 20 between the flats 44 and 46 and the flats 47 and 48 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, shown in FIGS. 1, 2–5, and 7–9, is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is possible to connect the side legs 64 and 66 at a lower portion by an arcuate member.

A pair of projections 70 extend along the length of the retainer 60 between opposed side edges of the side legs 64 and 66, respectively. The projections 70 are located adjacent the outer end 72 of each leg 64 and, by example only 66. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66. The lock tabs 74 engage notches 76 in the first end 24 the housing 12 when the retainer 10 is fully inserted in the housing 12. The lock tabs 74 are offset from the center of the length of each of the side legs 62 and 64 so as to be located generally closer to one side end of the retainer 10 than the opposed side end. Similarly, the notches 76 formed in the housing 12 closer to the first end 24 of the housing 12. This provides a visual indication of a proper orientation of the retainer 60 in the housing 12 to insure that the retainer 10 is correctly positioned to lock the male component 14 in the housing 12.

As shown in FIGS. 1, 2, 5 and 7, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 41 of the male component 14. The outer ends 90 of each of the arms 82 and 84 are angled or tapered to act as a guide surface to assist in sliding movement of the arms 82 and 84 over the tubular end 41 of the male component 14.

Figure 2:
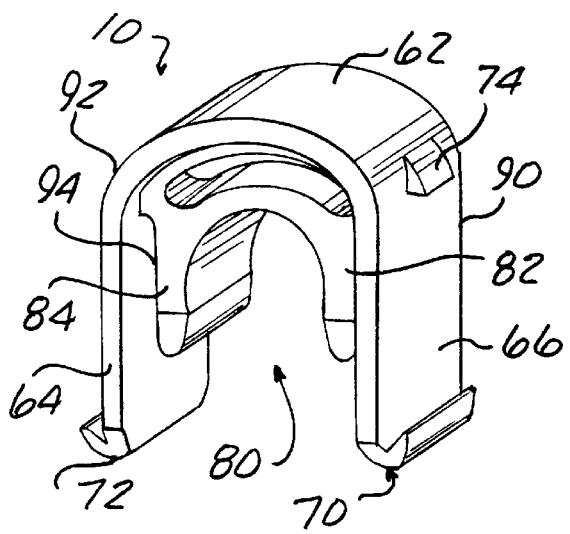
FIG. 2 is an enlarged, left end, perspective view of the snap-on retainer shown in FIG. 1.
Figure 8:
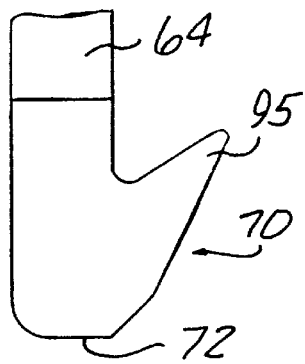
FIG. 8 is a partial, enlarged view of one of the hook-like ends of the legs of the retainer.
Figure 7:
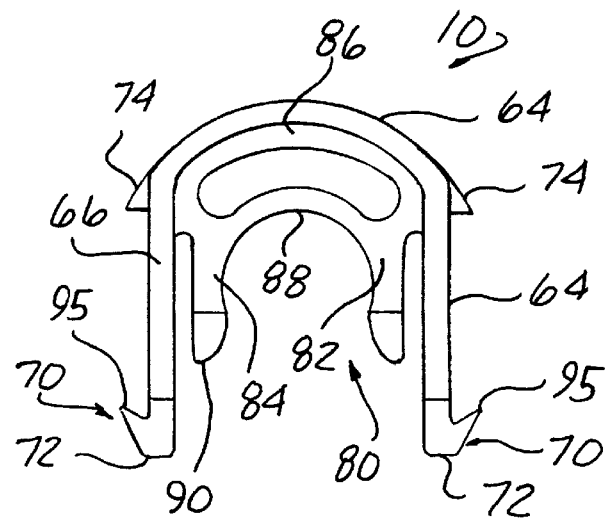
FIG. 7 is an end, elevation view of the snap-on retainer shown in FIGS. 1 and 2.

As shown in FIGS. 1, 2 and 7, each of the arms 82 and 84 extends from one side end contiguous with a first side end 90 of the retainer 10 to an opposed side end which is spaced from a second side end 92 of the retainer 10. This forms a slot or recess 94 within the interior of the legs 64 and 66 of the retainer 10 and the end of the arms 82 and 84. The recess 94, as shown in FIG. 5, is positioned to receive the annular flange 42 on the male component 14 only when the male component 14 is fully inserted into the female component or housing 12. This insures a fully seated, sealed connection between the male component 14 and the female component 12 while completely locking the male component 14 in the housing 12.

As shown in FIGS. 1, 2, 7 and 8, the projections 70 on the legs 64 and 66 of the retainer 10 are uniquely formed with an angled hook-like shape terminating in a tip 95. The tip 95 is disposed at an acute, upturned angle with respect to the corresponding legs 64 or 66.

Figure 6:
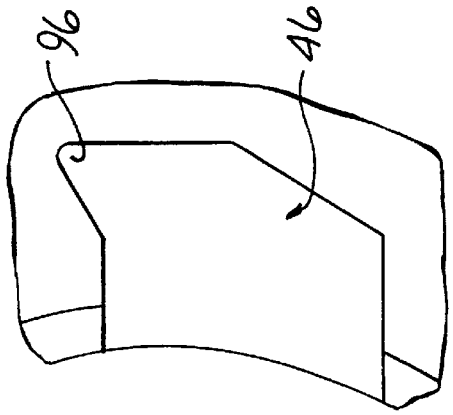
FIG. 6 is a partial, enlarged view of one of the longitudinal grooves formed in the housing of the quick connector shown in FIG. 1.

Similarly, as shown in FIGS. 3 and 4, and in greater detail in FIG. 6, the grooves 40 and 42, such as groove 40, are formed with a recess or notch 96 at one end which is shaped complimentary to the shape of the tip 95 of the projection 90 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40 and 42 in the housing 12 as shown in the partially inserted position of the retainer 10 in FIG. 3. It should be noted that the outer surface of the housing 12 adjacent the first end 24 is formed with a pair of flats 44 and 46 which are disposed at an angle complimentary to the acute angle of the tips 95 on the legs 64 and 66 of the retainer 10. This interlock of the tips 95 with the flats 44 and 46 resists pull out of the retainer 10 from the housing 12.

Figure 9:
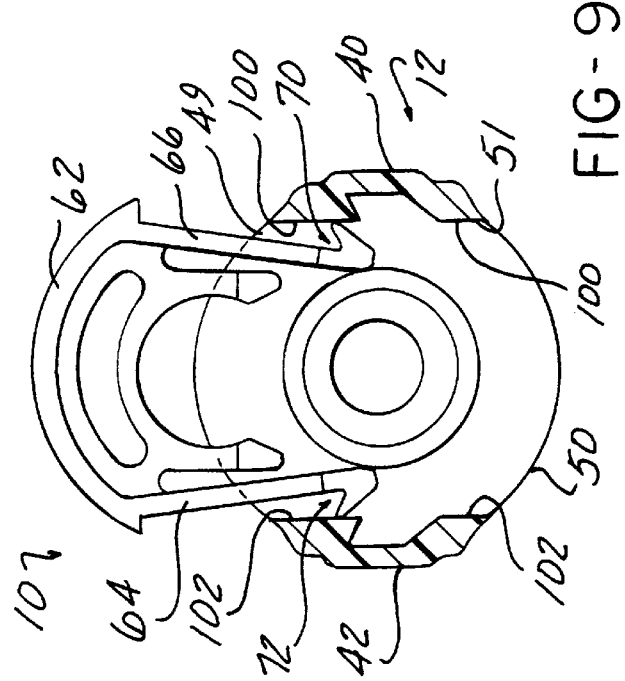
FIG. 9 is a cross section view showing the insertion of the retainer into the housing.

The hook shaped tips 95 on the legs 64 and 66 of the retainer 10 in conjunction with the grooves 40 and 42 in the housing 12 also provide, a distinct, "avalanche effect" snap action of the retainer 10 in the housing 12 as shown in FIG. 9. The grooves 40 and 42 in the housing 12 are formed in generally planar flat surfaces 100 and 102, respectively. The surfaces 102 and 104 force the ends 72 of the legs 64 and 66 laterally inward toward each other when the retainer 10 is inserted into the housing 12. When the tips 95 clear one edge of the grooves 40 and 42, the resilient nature of the legs 64 and 66 snaps the ends 72 and tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4. It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the surfaces 100 and 102. When the tips 95 clear the outer end of the surfaces 100 and 102, the legs 64 and 66 spring laterally outward in a distinct "avalanche effect" manner. The lower ends of the grooves 40 and 42 are angled inward to enable the tips 95 to slide out of the grooves 40 and 42.

The retainer 10 can be first be installed on the housing 12 in a shipping or storage position as shown in FIG. 3. In this position, the projections 90 on the side legs 64 and 66 of the retainer 10 snap into and engage the longitudinally extending groves 40 and 42.

Further insertion of the retainer 10 through the aligned apertures 49 and 51 in the housing 12 causes the ends 72 of the legs 64 and 66 to pass along the lower portion of the surfaces 100 and 102 until the tips 95 clear the ends of the surfaces 100 and 102 and then snap outward exteriorly of the outer surface of the first end 24 of the housing 12 as shown in FIG. 4. In this fully inserted position of the male component 14 in the female component 12, the annular flange 42 on the male component 14 is situated ahead the legs 64 and 66 on the retainer 10. This position represents the fully latched position in which the male component 14 is fully seated in and lockingly engaged with the female component 12. The full insertion of the retainer 10 into the housing 12 also provides visible indication of the fully locked connection of the male and female components 14 and 12, respectively.

It should be noted that if the male component 14 is not fully engaged or seated within the housing 12, the annular flange 42 on the male component 14 will not be properly situated within the transverse bore in the housing 12 to slidably receive the recess 94 in the retainer 10. If the annular flange 42 on the male component 14 is at any position other than shown in phantom in FIG. 5, the arms 82 and 84 on the retainer 10 will contact the annular flange 42. Since the spacing between the inner surfaces of the legs 82 and 84 is less than the outer diameter of the annular flange 42, the retainer 10 cannot be moved to the fully inserted position thereby providing an indication of an incomplete seating or mounting of the tip 41 of the male component 14 in the housing 12.

In summary, there has been disclosed a unique snap-on retainer for a quick connector which has increased pull out force resistance to separation of the retainer from the female component or housing. The snap-on retainer of the present invention also provides a visible indication of a sealed and locked connection between the male and female connector components and insures that the male component is fully inserted into the female component before the retainer can be urged into the fully latched position.

What is claimed is:

1. A quick connector comprising:
   mating male and female components;
   the male component having a first end portion terminating in a tip end and a radially enlarged annular flange spaced from the tip end;
   the female component including a housing having a through bore formed of at least a first axially extending bore portion disposed adjacent to an open first end of the housing for receiving the male component therein;
   first and second opposed, aligned apertures formed in the housing in transverse communication with the first bore portion in the housing and forming a transverse bore extending through the housing; and
   retainer means, slidable through the first and second apertures in the housing, for releasibly locking the male and female components together, the retainer means including:
   a body having an end wall and first and second spaced legs extending from the end wall, each of the first and second legs having opposed first and second side edges;
   first and second arms formed on the body interiorly of the first and second legs, respectively, the first and second arms spaced apart a distance less than an outer diameter of the annular flange of the male component;
   the first and second arms axially extending between the first and second side edges of the first and second legs for a distance less than a length of the first and second legs between the first and second side edges of the first and second legs to form a recess interiorly of the first and second legs for receiving the annular flange on the male only when the male component is fully seated within the female component; and
   projections formed on the first and second legs in the form of outward angled hooks releasibly engageable with an outer surface of the housing after the retainer is fully inserted into the transverse bore in the housing and the ends of the legs project outward through one of the first and second apertures in the housing.

2. The quick connector of claim 1 wherein:
   the hooks are formed of an end portion; and a tip extending angularly outward from the end portion.

3. The quick connector of claim 2 wherein the tip is disposed at an acute angle with respect to the adjacent one of the first and second legs.

4. The quick connector of claim 3 further comprising:
   at least one flat formed on the housing disposed at an angle complimentary to the angle of the tip on one of the first and second legs of the retainer.

5. The quick connector of claim 3 further comprising:
   a pair of grooves formed in the first bore portion of the housing, the grooves extending axially from the first open end of the housing;
   the grooves having a recess engageable by the hooks to lock the retainer in a partially inserted position in the housing.

6. The quick connector of claim 5 wherein:
   each recess includes an interior edge angled complimentary to the angle of the tip of the hooks.

7. The quick connector of claim 1 further comprising:
   at least one tab extending laterally outward from one of the first and second legs on the body;
   a notch formed in the first end of the housing adjacent to one of the apertures in the first end of the housing for receiving the tab; and
   the notch spaced off center within the one of the apertures in the housing for receiving the tab on the retainer in only one orientation of the retainer in the transverse bore in the housing.

8. The quick connector of claim 1 further comprising:
   a recess formed exteriorly of the first and second legs of the body and between one of the side edges of the first and second legs and the first and second arms on the body, the recess and an end surface of the first and second arms forming a radial flange engaging surface for receiving the annular flange on the male component and enabling a full insertion of the retainer into the transverse bore in the housing only when the male component is fully inserted into the axially extending bore portion in the housing.

* * * * *